I. W. CLARK.
RETREADER.
APPLICATION FILED FEB. 16, 1920. RENEWED APR. 27, 1922.
1,435,279.   Patented Nov. 14, 1922.
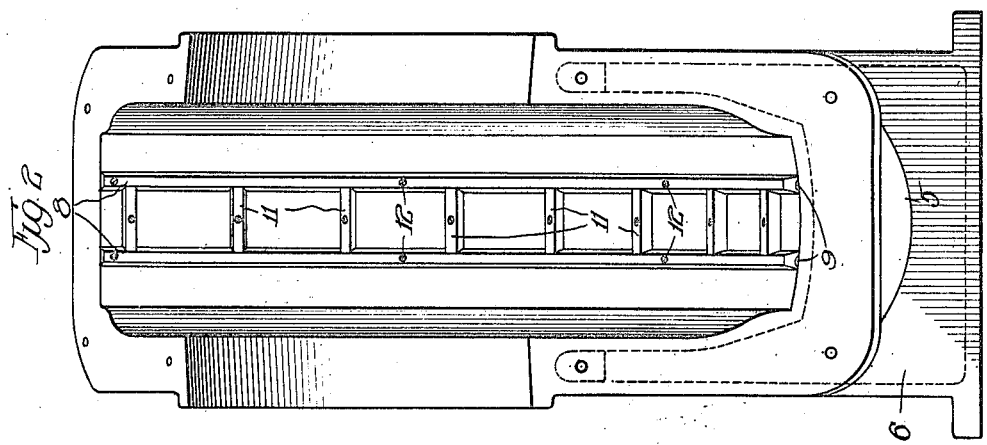
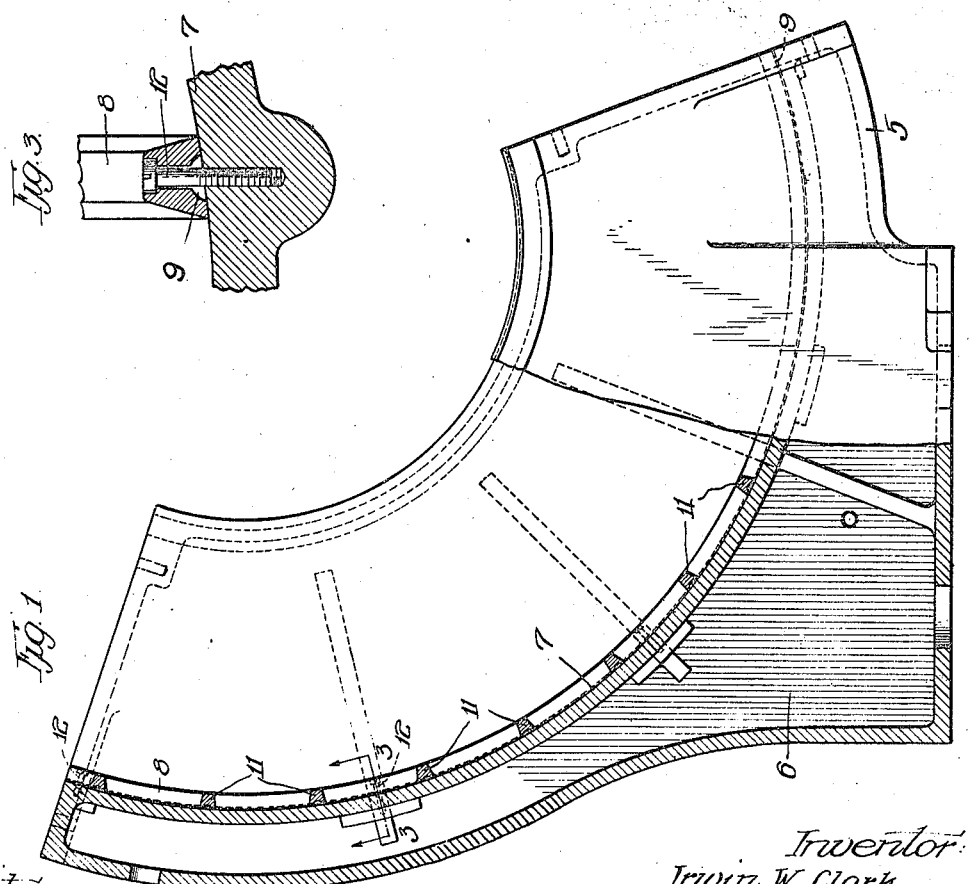

Patented Nov. 14, 1922.

1,435,279

UNITED STATES PATENT OFFICE.

IRWIN W. CLARK, OF EVANSTON, ILLINOIS, ASSIGNOR, BY MESNE ASSIGNMENTS, TO HERBERT K. WHEELOCK.

RETREADER.

Application filed February 16, 1920, Serial No. 358,911. Renewed April 27, 1922. Serial No. 557,036.

*To all whom it may concern:*

Be it known that I, IRWIN W. CLARK, a citizen of the United States, residing at Evanston, in the county of Cook and State of Illinois, have invented certain new and useful Improvements in Retreaders, of which the following is a specification.

This invention relates to vulcanizers, and refers particularly, although not exclusively, to retreaders for repairing automobile tires.

The usual form of retreader as heretofore used consists of a mold having a vulcanizing bed with a removable matrix therein against which the tire casing is firmly clamped during the process of vulcanization. Since the advent of corrugated or non-skid tires, the matrices of the retreaders have been supplied with configurations to form corresponding configurations in the tire. It has been found that when tire casings are pressed into the vulcanizing bed a certain amount of air is imprisoned between the outer walls of the tire casing and the matrix, resulting in the formation of recesses or blow-holes in the tire casing, particularly at the bases of the configurations in the matrix contained in the vulcanizing bed. To overcome this difficulty, the matrix has been provided with a system of venting consisting of apertures extending through the wall of the matrix.

The retreaders with which my invention is used are ordinarily supplied with heat for performing the vulcanizing operation by means of steam in a chamber immediately adjacent the vulcanizing bed so that the heat of the steam may pass through the walls of the bed and the proper temperature thereby obtained.

An object of my invention is to eliminate the necessity of using a matrix in the vulcanizing bed while at the same time making provision for forming configurations on the tire and for providing an adequate venting system.

This and other objects of my invention will be more readily understood by reference to the drawings, in which—

Figure 1 is a vertical sectional view through a retreader embodying the improvements of my invention;

Figure 2 is an end elevation of the device of Figure 1; and

Figure 3 is an enlarged sectional view on line 3—3 of Figure 1.

The retreader consists of a hollow casing 5 which is of cast iron or other suitable material and which is supported on a base (not shown) so as to be readily accessible for vulcanizing purposes. Within the casing 5 is a steam chamber 6 which may be directly connected with a source of steam, or which chamber may be supplied with water and steam formed by heating the same with gas or other suitable fuel. The casing 5 has a longitudinally extending arcuate groove 7 therein which receives a section of the tire casing to be vulcanized, an adjacent section of the tire being moved into the vulcanizing bed after the first section has been vulcanized, this operation being repeated until the entire tire casing has been vulcanized. In the embodiment shown in the drawing the configuration-forming elements comprise two parallel strips 8 which are used when retreading a plain-tread tire having circumferential grooves therein, this form of tread being used widely on plain-tread cord tires, and which members are preferably made of cast iron.

The venting means which I have provided include grooving the under or bottom surfaces of the members 8, as indicated at 9 in Figures 2 and 3, this grooved or venting space extending throughout the length of the members 8. In the drawings I have shown cross-pieces 11 extending between the members 8 which may be used to form corresponding grooves in the tire. In the event these are used the bottom surfaces thereof are grooved correspondingly to the grooves 9 in the members 8 and are in communication with the grooves 9 in the members 8. The members 8 are secured to the casing by cap screws 12 placed at suitable intervals. It will be noted by reference to Figure 3 that the outer or tire-engaging faces of the members 9 are counterbored to receive the heads of the screws 12, the counterbores being slightly larger than the screws; also that the holes through which the screws pass are slightly larger than the screws. This is for the purpose of serving as a means of escape to the grooves 9 for the air which has been imprisoned between the tire and the vulcanizing bed. Also the ends of the grooves 9 are carried as before stated to the ends of the members 8 so that any air therein may escape to the atmosphere at the ends of the members 8.

The usual practice when a tire casing is placed in a vulcanizing bed is to force the same into close contact with the latter by means of clamps or otherwise. Whenever any means has been used to form configurations in the tire casing it has been found that air has been trapped between the tire casing and the members comprising such configuration forming members, resulting in the formation of blow-holes in the finished tire casing. This objection is overcome by my invention, in that when the tire casing is forced into a vulcanizing bed containing my invention the air which is trapped between the tire and the configuration forming members is forced into the grooves 9 on the under sides of the members 8, through the enlarged screw holes, and also under the edges of the members 8, the contact of the members 8 on the vulcanizing bed being such as to permit ingress and egress of air. Therefore when the unvulcanized tire is inserted in a bed the trapped air is expelled under the edges of the members 8 into the grooves therein and also through the enlarged openings about the screws holding the members in position. The openings of the screw holes are not so large as to permit the admission of uncured rubber therethrough as the tire is forced into position in the vulcanizing bed.

It will be apparent to those skilled in the art that changes could be made in the details of construction which I have described without departing from the spirit or scope of my invention.

I claim:

1. A vulcanizer comprising a vulcanizing bed having means fixedly associated therewith for forming configurations in a tire, said means being provided with venting recesses on the under sides thereof which recesses are in communication with the atmosphere.

2. A vulcanizer comprising a concave vulcanizing bed having removable configuration-forming means therein, said means being provided with venting grooves on the under side thereof.

3. A vulcanizer comprising a concave bed and a plurality of longitudinally extending configuration-forming members therein, said members being provided with grooves on the under surfaces thereof and having openings for communication with said grooves.

4. A vulcanizer comprising a concave bed and a plurality of longitudinally extending configuration-forming members therein, said members being provided with grooves on the under surfaces thereof and having openings for communication with said grooves, and transverse members joining said longitudinal members, said transverse members also having venting grooves on the under sides thereof communicating with the venting grooves of said longitudinal members.

Signed at Chicago, Illinois, this 12th day of February, 1920.

IRWIN W. CLARK.